July 1, 1924.

H. C. PRATT 1,499,472

AIRPLANE LANDING MECHANISM

Filed July 14, 1922    3 Sheets-Sheet 1

Inventor
Hazen C. Pratt,
by Roberts, Roberts & Cushman
his Attorneys

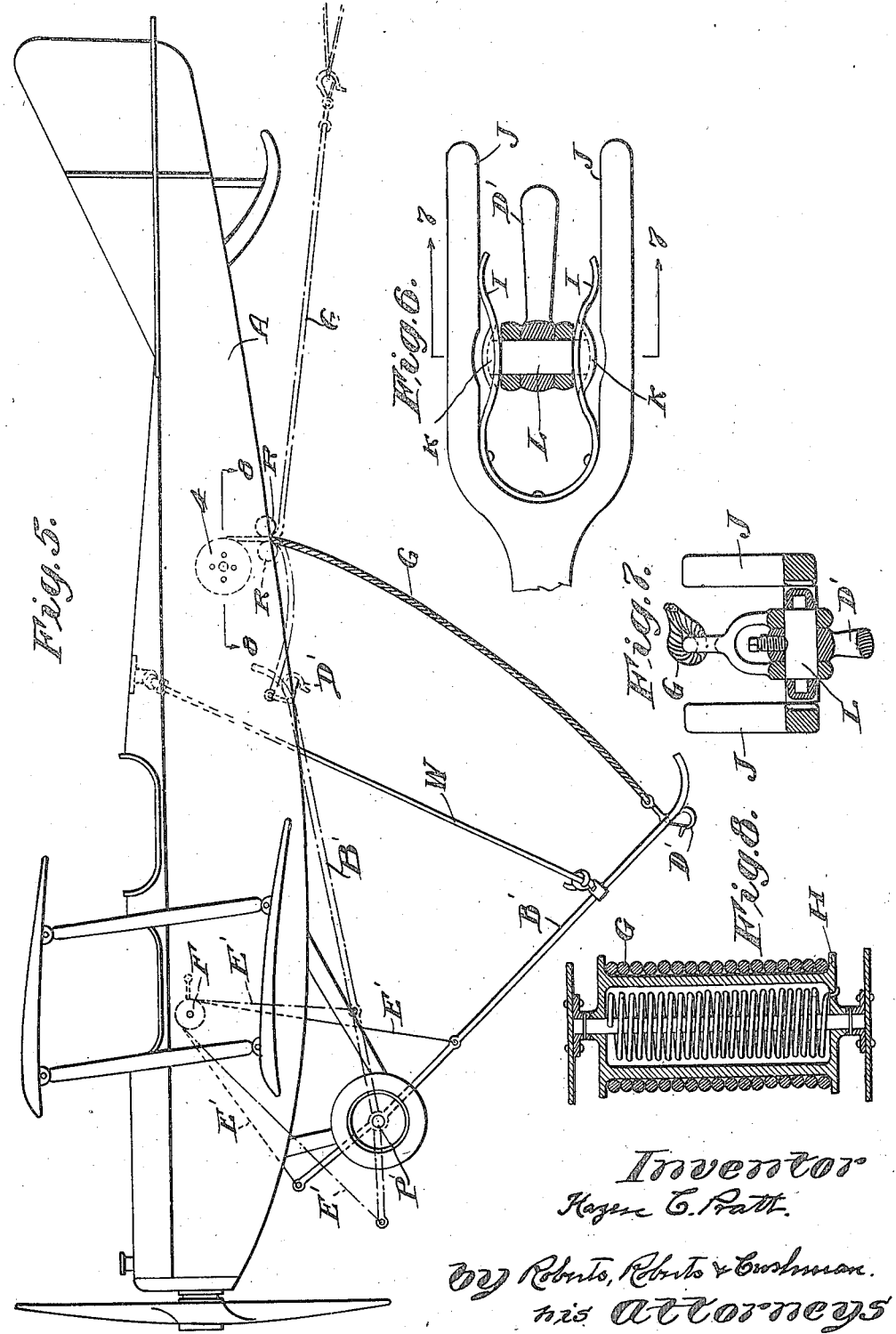

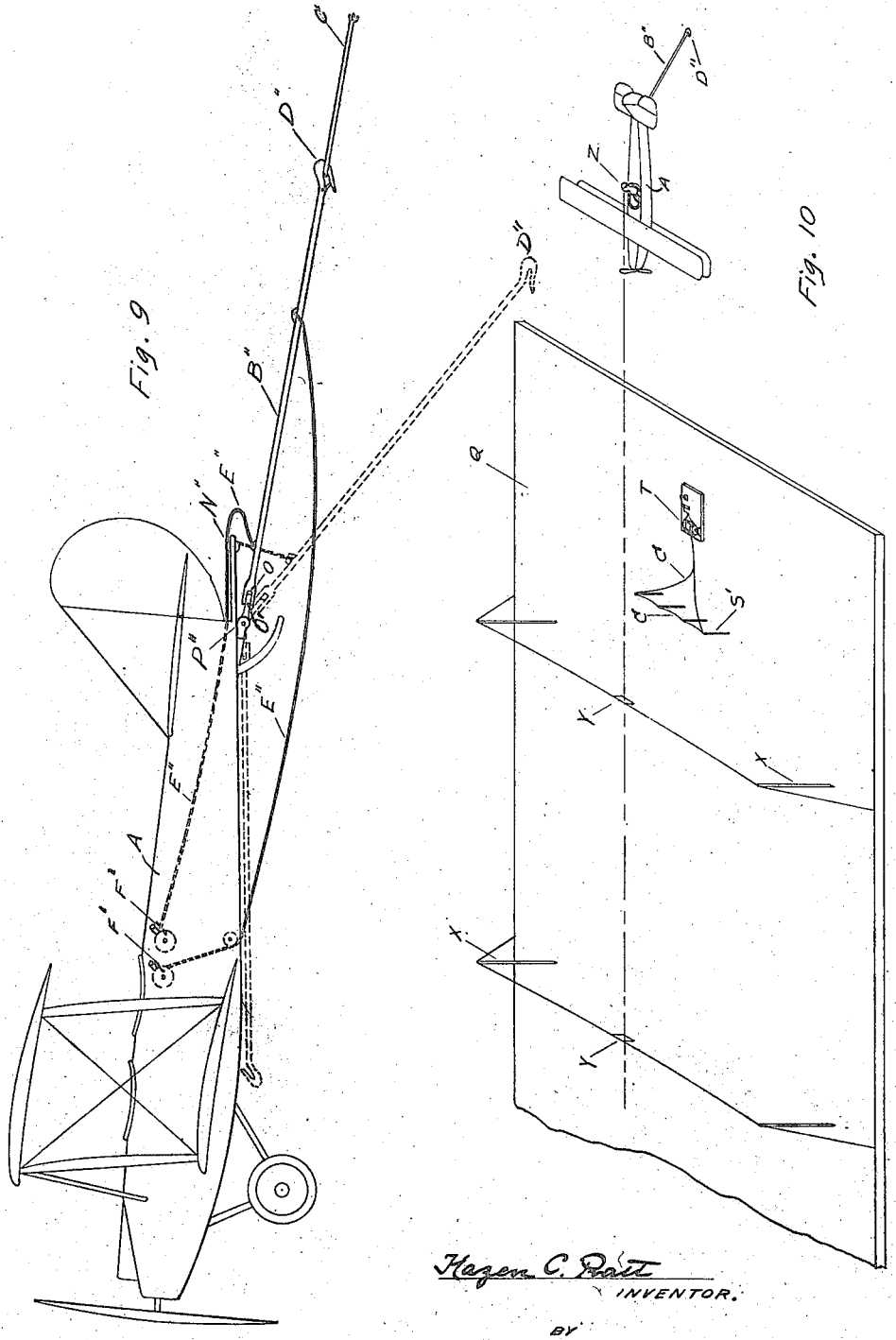

Patented July 1, 1924.

1,499,472

UNITED STATES PATENT OFFICE.

HAZEN C. PRATT, OF CAMBRIDGE, MASSACHUSETTS.

AIRPLANE-LANDING MECHANISM.

Application filed July 14, 1922. Serial No. 575,131.

*To all whom it may concern:*

Be it known that I, HAZEN C. PRATT, a citizen of the United States of America, and resident of Cambridge, in the county of Middlesex and State of Massachusetts, have invented new and useful Improvements in Airplane-Landing Mechanism, of which the following is a specification.

The invention relates to mechanism for retarding the speed and stopping aircraft when in flight. In landing aircraft which cannot be decelerated to a slow velocity before alighting, a long field or other area is ordinarily required along which the craft glides before it comes to rest. In many localities landing fields of the required extent and level surfaces are not available, and even where they are found, high speed aircraft are liable to be damaged in landing.

In order to overcome the aforesaid difficulties, it has been proposed to provide retarding means for engaging the craft just before, or at the time when it alights, to bring it to rest in a relatively short distance. Such devices have usually embodied arms or hooks projecting beyond the lateral limits of the outline of the craft, and usually upwardly near the center of the craft, to engage a loop, cable or the like as a part of the retarding means fixed at the landing place, the said loop or cable being suspended at such height that the craft may fly thereunder. These devices have not been successful, chiefly for the reason that the retarding force has a pronounced tendency to tip the craft, and indeed to overturn it, inasmuch as the force is applied at one side of the craft, and in front of its center of gravity.

The object of the present invention is to overcome the aforesaid disadvantages and to provide landing mechanism which will quickly and safely stop aircraft within a restricted space and which can be controlled by the aircraft operator, or pilot, with facility and certainty.

This invention involves a marked departure from the prior attempts toward the same ends, in that the hook or catch on the aircraft is associated therewith so that the retarding force is transmitted to the craft in the rear of its center of gravity and preferably in approximately horizontal alinement therewith, whereby the craft may be retarded without tendency to overturn.

The mass of the aircraft may be regarded as concentrated at the center of gravity, and the force of momentum as acting at that point. As the momentum of the craft is resisted by the retarding force applied, the two forces will work in opposition, the former acting at the center of gravity and the latter behind the center of gravity in such manner as to straighten the aircraft into correct alignment with and maintain it in its path. Thus the application of this retarding force to the craft at a point in the rear of its center of gravity, not only will avoid a harmful tendency, but will produce a positive beneficial effect on the stability of the aircraft; resisting any tendency to overturn, caused by other influences, such for instance, as obstacles encountered by the wheels of the aircraft when landing. This effect is not obtained unless the retarding force is applied to the plane at a point in the rear of its center of gravity and such a force tends to maintain the plane in an upright position when it strikes the landing surface and effects a landing by causing a decrease in the velocity of the plane until the resulting loss in lift or buoyancy allows the plane to settle into contact with the landing surface.

Instead of projecting laterally in a plane above or below the craft, the hook is arranged to lie, at least when in operative position, substantially within or behind the lateral or transverse outline and preferably approximately in the longitudinal vertical median plane of the area within said outline. A rod or other guiding means extending obliquely from the craft is provided to bring the hook and the retarding and stopping means into engagement.

The invention has the further advantage that the engagement with the landing device on the ground is made and the retarding action begun before the aircraft lands. The landing of the aircraft is accomplished by the loss of buoyance occasioned by its loss of speed incident to retardation after engagement with the landing device on the ground or platform, which may be assisted by the downward component of the retarding force.

If for any reason the pilot fails to engage the landing device, as the craft is still in the air, he may continue his flight without landing, avoid the danger of landing in a restricted space without the desired retardation, and may then return to make a fresh attempt. The retarding force is applied and retardation begun at a predetermined point as early as possible in the landing operation, and thus conserving to the utmost the space available.

Also, the invention comprises a device such as a rod or lever pivoted to the body of the airplane to guide the landing device and hook or catch into engagement; such lever being held at its free end so as to be released readily by the operator and caused to assume a position inclined to said body for the purpose of guiding together the engaging hook and the landing device secured at a fixed location at a landing place, and to be returned to a normal position within the area between planes which bound the vertical limits of the airplane structure, either automatically by a spring, such as the elastic cord W, (Fig. 5), by the action of the land device upon the guiding lever or by the operator through the releasing connections attached thereto; there is also provided a landing device secured at a fixed location at the landing field, and held by supports in a position to adapt it to be guided by the inclined lever and caught by the engaging hook, when the airplane passes that location. This landing device may be attached to yielding connections, such as flexible stanchions, springs, or air cushions to prevent too abrupt stoppage of the plane when alighting. And in order that the retarding effect may begin while the craft is still in the air and before it arrives over the restricted landing area, a ship's deck for instance, the retarding device may be held upon supports extending to the rear of such landing area.

The guiding lever may be pivoted to the body of the airplane either at the forward end or at the rear end. In the latter case the engaging hook is located at the pivoted end of the guiding lever and in the former case such hook is held at the free end of the guiding lever by devices from which it may be readily released, or the hook may be held at the free end of the guiding lever at all times, the guiding lever taking the direction of the path of the aircraft during retardation. In the latter case the landing device on the ground, or platform, serves to move the guiding member into position which will not interfere with the landing of the aircraft; in each case the inclined lever serves to guide the landing device and hook into engagement.

In the drawings forming a part of this specification:

Fig. 5, is a side elevation of an airplane body with a modification of the guiding lever and engaging hook for the landing device, said lever being illustrated as pivoted at the axle of the landing wheels, and its return to normal position controlled by an elastic cord;

Fig. 6, is an enlarged plan view of the end of the guiding lever and the means for holding the engaging hook therein;

Fig. 7, is a sectional view on line 7—7, Fig. 6;

Fig. 8, is a longitudinal central section of the spring actuated drum on line 8—8, Fig. 5.

Fig. 9, is a side elevation of an airplane showing modification of the connections of the guiding lever with the body of the airplane and the means for operating it;

Fig. 10, is an illustration of a restricted landing field or platform, with the cable landing-device held at the upper ends of flexible supports and arranged in a loop to intercept and be caught by the hook.

Figure 1:
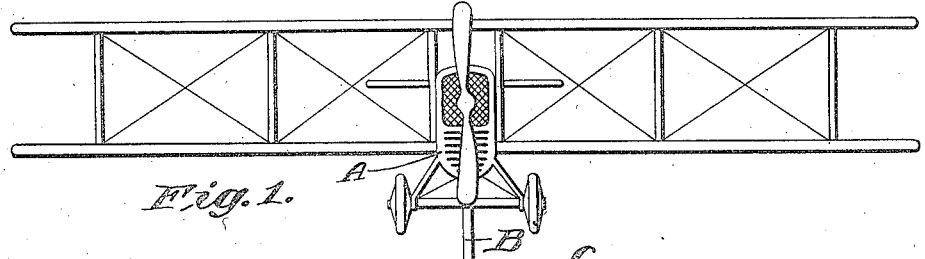
Fig. 1, is a front elevation of air airplane approaching a landing device secured to spring controlled drums.

Referring to the drawings by designating characters, A, is the body of the airplane to which a guiding lever B, B', or B'', is pivoted, in one case at P, P'' near the rear end of the plane and in the other case at P' near the front of the plane, so that the free ends of the levers may be released and allowed to drop to an inclined position, as shown in Figures 1, 5 and 9, with their free ends located outside of the planes which bound the vertical limits of the airplane structure where the levers may come into contact with a landing device, such as a cable C, supported at a fixed location, and thus be guided to a hook D, D' or D'' intended for engaging the landing device C. The levers B, B', B'', are respectively controlled by cables E, E', E'', by which they are released and lowered or raised to their normal positions. These cables are operated by a drum and crank F, F', within the body of the plane, convenient to the operator.

Figure 2:
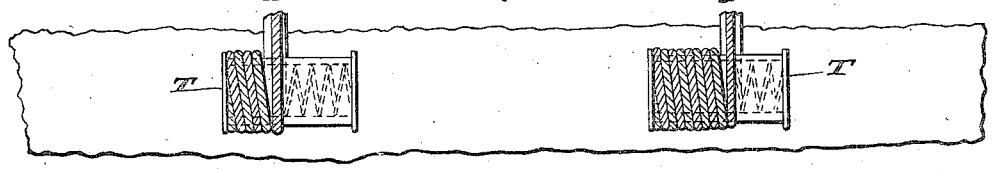
Fig. 2, is a side elevation of an airplane showing one form of the improved mechanism for engaging the landing device.
Figure 2:
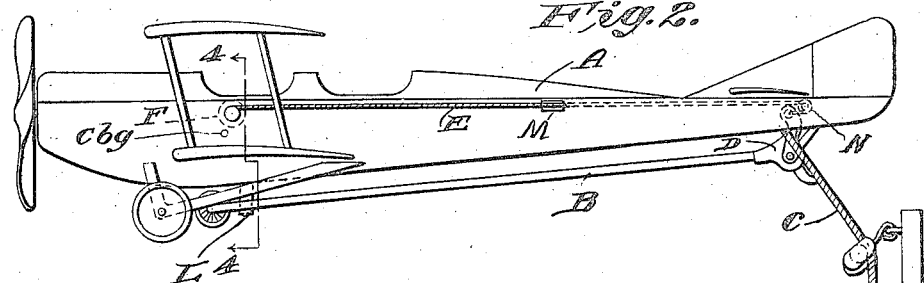
Figure 4:
Fig. 4, is a vertical section through the plane on line 4—4, Fig. 2, looking toward the front of the plane.
Figure 4:
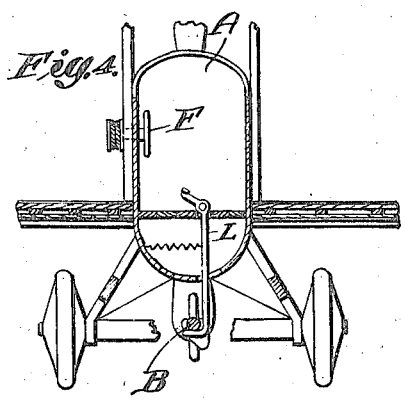

As shown in Fig. 2, the cable E runs outside of the body A, as far as the sheave M, around which it is led inside of the body and thence back to another sheave N, and thence is fastened to the hook D.

Figure 3:
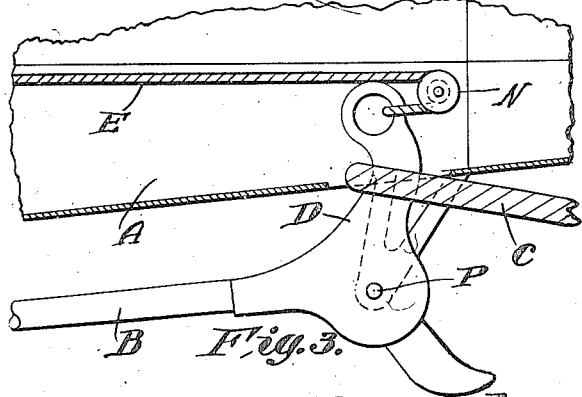
Fig. 3, is a sectional view of a fragment of a plane with the engaging hook and its connections on an enlarged scale.

In the arrangement shown in Figs. 2 and 3, the lever B, may be automatically raised by contact of the landing device C with the hooked end D of that lever, or B' by an elastic cord W, or B'' by the cord E'' or by a spring (not shown) engaging the lever B', near its pivot. When such springs are used the lever B' is moved away from the fuselage by the operator, by means of one of the cables E, E', E''. The free end of the lever B when in its normal position, which is substantially parallel with the body of the plane, may be held by a latch L, controlled by mechanism within said body, and the outer end of the lever is provided with an anti-friction device, such as a wheel V, to readily ride over any unintentional moderate obstruction in the surface of the landing field. In the arrangement shown in Fig. 5, the engaging hook D' is normally supported and held at the free end of the lever B' by a device with which it is readily engaged and from which it is easily detached by the pull of the landing device C. A cable is attached to the hook and led between guiding rolls R, to a spring actuated drum H located in the rear of the center of gravity of the craft and by which the slack of the cable G, is taken up when the lever B' is raised. In Fig. 5, the guiding lever B' which is shown in an inclined position, the hook D' and connecting cable G, are shown in full lines and in broken lines to indicate the position when the said lever is drawn up, and also after the hook D' has been detached from the lever and pulled back by the engagement therewith of the landing device C.

As herein shown this landing device consists of a cable C stretched between two upright supports S, with the ends of the cable attached to spring-actuated drums T, and the supports S may be made flexible, or spring controlled, to serve as shock absorbers to the first retarding pull upon the aircraft.

In Fig. 9, the lever B'', in full lines, is shown in a position drawn back at an angle to the body of the airplane by the engagement therewith of the landing cable C; in dotted lines, in a position where it is drawn up against the body of the airplane and also in the inclined position when first released ready to engage the cable C. This lever B'' is attached to the body of the airplane by a double joint O, O', the latter being pivoted to the plane at P'; by this means the lever B'' is capable of the movements of a universal joint, to accommodate itself to the initial pull of the retarding device in any direction.

Figure 10 shows a restricted landing field, or platform Q, at one end of which are fixed flexible supports S', to the upper ends of these the landing cable C, is attached and spread into the form of a loop to be more readily caught by the hook D' or D''.

Across the restricted field Q, two or more observation targets Y, are supported by cords stretched between standards X. These targets and the loop of the cable C, are arranged in line, and the pilot as he approaches the field directs his airplane in such manner as to bring the targets Y, into line with his vision, as at Z, which will give the proper elevation to the airplane and also ensure the engagement of the hook D'' with the loop of the cable C, as indicated by the line Z, Y, Y in Fig. 10.

Convenient means by which the hook D' may be readily attached to and detached from the lever B' in the arrangement shown in Fig. 6, consists of springs I, secured within the forked ends J, of the lever B', which springs may be provided with shallow depressions K, into which the ends of the pivot L, of the hook D' may be readily inserted and easily removed. These ends may be rectangular with slightly rounded corners, so as to properly hold in the depressions K, and yet be removed without difficulty.

It will be seen that when the hook D' has been pulled from its connection with the lever B', the spring within the drum H, will draw up the slack of the cable G, and then resist the pull of the plane until the airplane is stopped. This is in addition to the resistance of the springs in the drums T.

If it is desired to prevent the springs within the drums T, from pulling the airplane backward after it has come to rest, a pawl may be provided upon the supporting frame of the drum, to engage a ratchet upon the drum.

I claim:

1. Aircraft landing mechanism, comprising a catch on the craft adapted to engage a stationary retarder, said catch being connected to the craft in such manner that the retarding force applied thereto is transmitted to the craft in the rear of its center of gravity and approximately in fore-and-aft alinement with the center of gravity, whereby the craft may be retarded in landing without substantial tendency to overturn.

2. Aircraft landing mechanism, comprising a catch on the craft adapted, in its operative position, to engage a stationary retarder, said catch being so disposed in the rear of the center of gravity of the craft as not to project beyond the lateral outline of the fuselage of the craft, and means adapted to be projected beyond the vertical outline of the body of the craft, to guide the said retarder and catch into engagement.

3. Aircraft landing mechanism, comprising a catch on the craft, which when in its operative position will engage a retarder, said catch being so disposed in the rear of the center of gravity of the craft as not to project beyond the lateral outline of the fuselage of the craft, and a rod extending obliquely from the craft beyond its vertical outline, to guide the retarder and catch into engagement.

4. Aircraft landing mechanism, comprising a member adjustably supported on the plane, a hooked member carried by said adjustable member for engaging landing mechanism and attached to the plane at a point in the rear of its center of gravity, and means within the control of the pilot for moving said adjustable member to desired positions.

5. Airplane landing mechanism, comprising a hook to engage the landing device, a member attached to the plane and adapted to guide said hook and landing device into engagement and a support for the hook near the end of said guiding member.

6. Air craft landing mechanism, comprising an engaging hook attached to the craft at a point in the rear of its center of gravity, and a guiding device to support said hook until detached by the landing mechanism.

7. Airplane landing mechanism comprising a landing device at a fixed location, a member pivoted to the plane, an engaging hook supported near the end of such member, which latter is adapted to guide the said landing device and hook into engagement, and means within the control of the pilot for adjusting said guiding member to desired positions in relation to the body of the plane.

8. Airplane landing mechanism, comprising a guiding member pivoted to the airplane and adapted to be moved to an inclined position extending beyond the limits of planes bounding the vertical area of the fuselage of the airplane, a device attached to the plane and provided with a hook to engage landing mechanism and means within the control of the pilot for adjusting the guiding member to desired positions to adapt it to cause the landing mechanism to engage said hook.

9. Airplane landing mechanism, comprising a landing device, a guiding member therefor pivoted to the body of the airplane and normally maintained in a position within the area between planes bounding the vertical limits of the aircraft fuselage, means attached to the airplane in the rear of its center of gravity to engage the landing device, means to release said guiding member from its normal position and cause it to assume an inclined position in relation to the airplane and adapt it to engage the landing device secured in a predetermined location.

10. Airplane landing mechanism, comprising a guiding member pivoted to the plane and normally maintained in a position within the area between planes bounding the vertical limits of the airplane fuselage, means to release said member from its normal position and cause it to assume an inclined position in relation to the body of the plane, and means to automatically return the guiding member to its normal position.

11. Airplane landing mechanism consisting of an arm pivoted to the plane, a hook supported at the free end thereof which is adapted to engage a retarding device upon the landing surface and means connecting the plane and said arm which is adapted to cause the arm always to assume a position longitudinally in line with the direction of the retarding force applied.

12. Airplane landing mechanism, comprising a member pivoted to the airplane for guiding the landing device, a hook attached to said member at its free end to engage the landing device, a universal joint between the hook and the airplane and means within the control of the pilot to cause said member to assume desired positions outside of the area between planes which bound the vertical limits of the airplane structure.

13. Aircraft landing mechanism, comprising a landing device at a prescribed location, an adjustable member attached to and projecting from the aircraft, an engaging hook normally supported by said member, which latter is adapted to guide the landing device and hook into engagement, and universal connection between the hook and aircraft.

14. Airplane landing mechanism, comprising a stationary retarder on the landing surface, an arm attached to the airplane a universal joint between the plane and the arm to permit the ready adjustment of the latter to the direction of the pull of any retarding force and a hook at the free end of said arm which is adapted to engage said retarder.

15. The method of landing airplanes which consists in applying to such plane from a fixed retarding device at the landing surface while the plane is still in flight, a force which acts in the rear of its center of gravity and tends to maintain the plane in an upright position when it strikes the landing surface.

16. The method of landing aircraft upon restricted landing surfaces, which consists in guiding the plane above such surface in proximity thereto and parallel therewith, and while still in flight applying a retarding force to the craft in the rear of its center of gravity by means located upon the landing surface, and continuing the application of such force until the plane comes to rest.

Signed by me at Boston, Massachusetts, this thirteenth day of July, 1922.

HAZEN C. PRATT.

DISCLAIMER 1,499,472.—*Hazen C. Pratt*, Cambridge, Mass. AIRPLANE-LANDING MECHANISM. Patent dated July 1, 1924. Disclaimer filed February 15, 1937, by the patentee.

Hereby enters this disclaimer to each of claims 4, 5, 7, 8 and 11 of said Letters Patent.

[*Official Gazette March 23, 1937.*]